United States Patent
Iwata et al.

(10) Patent No.: US 9,963,380 B2
(45) Date of Patent: May 8, 2018

(54) BIOSOLUBLE INORGANIC FIBER

(71) Applicant: NICHIAS CORPORATION, Tokyo (JP)

(72) Inventors: Koji Iwata, Tokyo (JP); Hideki Kitahara, Tokyo (JP); Takahito Mochida, Tokyo (JP); Ken Yonaiyama, Tokyo (JP); Kazuki Soeda, Tokyo (JP); Tatsuro Miki, Tokyo (JP)

(73) Assignee: NICHIAS CORPORATION, Tokyo (JP)

( * ) Notice: Subject to any disclaimer, the term of this patent is extended or adjusted under 35 U.S.C. 154(b) by 0 days. days.

(21) Appl. No.: 15/319,891

(22) PCT Filed: Jun. 16, 2015

(86) PCT No.: PCT/JP2015/002996
§ 371 (c)(1),
(2) Date: Dec. 19, 2016

(87) PCT Pub. No.: WO2016/006164
PCT Pub. Date: Jan. 14, 2016

(65) Prior Publication Data
US 2017/0137319 A1 May 18, 2017

(30) Foreign Application Priority Data
Jul. 8, 2014 (JP) ................. 2014-140490

(51) Int. Cl.
C03C 13/00 (2006.01)
C03C 10/00 (2006.01)
D01F 9/08 (2006.01)

(52) U.S. Cl.
CPC ........ *C03C 13/006* (2013.01); *C03C 10/0045* (2013.01); *D01F 9/08* (2013.01); *C03C 2204/00* (2013.01); *C03C 2213/02* (2013.01)

(58) Field of Classification Search
CPC ................. C03C 13/00; C03C 13/06
See application file for complete search history.

(56) References Cited

U.S. PATENT DOCUMENTS

| | | |
|---|---|---|
| 5,932,500 A | 8/1999 | Jensen et al. |
| 6,265,335 B1 | 7/2001 | Oleske et al. |
| 2005/0085369 A1 | 4/2005 | Jensen |
| 2005/0233887 A1 | 10/2005 | Jubb et al. |
| 2009/0130937 A1 | 5/2009 | Wainwright et al. |
| 2010/0184581 A1 | 7/2010 | Berthereau et al. |
| 2013/0210602 A1 | 8/2013 | Nonaka et al. |
| 2014/0128530 A1 | 5/2014 | Yang |

FOREIGN PATENT DOCUMENTS

| | | |
|---|---|---|
| EP | 1038846 A1 | 9/2000 |
| EP | 2679710 A1 | 1/2014 |
| GB | 2277516 B | 11/1994 |
| GB | 2287934 A | 10/1995 |
| JP | H11-501277 A | 2/1999 |
| JP | 2005-511471 A | 4/2005 |
| JP | 2005514318 A | 5/2005 |
| JP | 3753416 B2 | 3/2006 |
| JP | 2009-515800 A | 4/2009 |
| WO | 96/14274 A2 | 5/1996 |
| WO | 03/050054 A1 | 6/2003 |
| WO | 03/059835 A1 | 7/2003 |
| WO | 2007/054697 A1 | 5/2007 |

OTHER PUBLICATIONS

Jul. 21, 2015 International Search Report issued in Patent Application No. PCT/JP2015/002996.
Jan. 10, 2017 International Preliminary Report on Patentability issued in Patent Application No. PCT/JP2015/002996.
Jan. 18, 2018 extended European Search Report issued in Application No. 1581323.6.

Primary Examiner — Elizabeth A. Bolden
(74) Attorney, Agent, or Firm — Oliff PLC

(57) ABSTRACT

Inorganic fibers including the following composition, $SiO_2$, $Al_2O_3$, MgO and CaO being main components, and the inorganic fibers being produced by a melting method: $SiO_2$: 3.0 wt % or more and less than 48.0 wt %, $Al_2O_3$: more than 20.0 wt % and 80.0 wt % or less, MgO: 1.0 wt % or more and 50.0 wt % or less, CaO: 1.0 wt % or more and 50.0 wt % or less, and $Fe_2O_3$: 0.0 wt % or more and less than 1.0 wt %.

8 Claims, No Drawings

BIOSOLUBLE INORGANIC FIBER

TECHNICAL FIELD

The invention relates to bio-soluble inorganic fibers.

BACKGROUND ART

Asbestos have been used as a heat-resistant sealing material, for example, since they are light in weight and have excellent heat resistance. However, use of asbestos is inhibited since it causes disorders of lungs. Therefore, instead of asbestos, ceramic fibers or the like have been used. It is thought that ceramic fibers or the like have excellent heat resistance which is equivalent to that of asbestos, and no health problem may occur as long as they are handled appropriately. However, there is a trend that a higher degree of safety is required. Under such circumstances, various bio-soluble fibers have been developed in order to realize bio-soluble fibers which do not cause or hardly causes health problems even if they are inhaled in a human body (see Patent Documents 1, 2 and 3, for example).

Most of commercially-available bio-soluble fibers have a high degree of solubility in physiological saline of pH 7.4. On the other hand, it is known that when fibers are inhaled in the lung, they are captured by macrophages. At the same time, it is known that the pH around macrophages is 4.5. Therefore, it is expected that the fibers having high solubility in physiological saline having pH of 4.5 are dissolved and decomposed in the lungs.

In addition, like asbestos, conventional inorganic fibers are secondary processed into a shaped product or an unshaped product together with various binders or additives, and are used as a joint in a heat treating apparatus, a furnace such as an industrial furnace, an incinerator or the like, a joint which fills the gap of a refractory tile, an insulating brick, a shell, and a refractory mortar, a sealing material, a packing material, an insulating material, or the like. In many cases, the inorganic fibers are exposed to high temperatures, and they are required to have heat resistance.

Further, in many cases, alumina is used in member of a furnace. There was a problem that fibers contained in a secondary-processed product react with the alumina, thereby causing the secondary product or the member to adhere and melt.

RELATED ART DOCUMENTS

Patent Documents

Patent Document 1: Japan Patent No. 3753416
Patent Document 2: JP-T-2005-514318
Patent Document 3: JP-T-2009-515800

SUMMARY OF THE INVENTION

An object of the invention is to provide inorganic fibers having excellent bio-solubility and alumina reactivity resistance.

According to the invention, the following inorganic fibers or the like are provided.
1. Inorganic fibers comprising the following composition, the four components of $SiO_2$, $Al_2O_3$, MgO and CaO being main components, and the inorganic fibers being produced by a melting method:
   $SiO_2$: 3.0 wt % or more and less than 48.0 wt %
   $Al_2O_3$: more than 20.0 wt % and 80.0 wt % or less
   MgO: 1.0 wt % or more and 50.0 wt % or less
   CaO: 1.0 wt % or more and 50.0 wt % or less
   $Fe_2O_3$: 0.0 wt % or more and less than 1.0 wt %.
2. The inorganic fibers according to 1, which have the following composition:
   $SiO_2$: 4.0 wt % or more and 40.0 wt % or less
   $Al_2O_3$: more than 20.0 wt % and 80.0 wt % or less
   MgO: 3.0 wt % or more and 50.0 wt % or less
   CaO: 6.0 wt % or more and 45.0 wt % or less
   $Fe_2O_3$: 0.0 wt % or more and less than 1.0 wt %.
3. The inorganic fibers according to 1, which have the following composition:
   $SiO_2$: 4.0 wt % or more and 35.0 wt % or less
   $Al_2O_3$: more than 20.0 wt % and 75.0 wt % or less
   MgO: 3.0 wt % or more and 45.0 wt % or less
   CaO: 7.4 wt % or more and 40.0 wt % or less
   $Fe_2O_3$: 0.0 wt % or more and less than 1.0 wt %.
4. The inorganic fibers according to 1 which have the following composition:
   $SiO_2$: 15.0 wt % or more and 35.0 wt % or less
   $Al_2O_3$: 40.0 wt % or more and 60.0 wt % or less
   MgO: 5.0 wt % or more and 20.0 wt % or less
   CaO: 8.0 wt % or more and 20.0 wt % or less
   $Fe_2O_3$: 0.0 wt % or more and less than 1.0 wt %
   total of the amounts of MgO and CaO: more than 18.0 wt %.
5. The inorganic fibers according to any one of 1 to 4, wherein the total of the amounts of $SiO_2$, $Al_2O_3$, MgO and CaO is more than 70.0 wt %.
6. The inorganic fibers according to any one of 1 to 4, wherein the total of the amounts of $SiO_2$, $Al_2O_3$, MgO and CaO is more than 80.0 wt %.
7. The inorganic fibers according to any one of 1 to 4, wherein the total of the amounts of $SiO_2$, $Al_2O_3$, MgO and CaO is more than 90.0 wt %.
8. The inorganic fibers according to any one of 1 to 7, which comprise one or more selected from $ZrO_2$, $TiO_2$, $Na_2O$, $K_2O$, $P_2O_5$ and $B_2O_3$. 9. A method for producing inorganic fibers, comprising:
   causing a melt to be inorganic fibers, the melt comprising the following composition wherein the four components of $SiO_2$, $Al_2O_3$, MgO and CaO are main components:
   $SiO_2$: 3.0 wt % or more and less than 48.0 wt %
   $Al_2O_3$: more than 20.0 wt % and 80.0 wt % or less
   MgO: 1.0 wt % or more and 50.0 wt % or less
   CaO: 1.0 wt % or more and 50.0 wt % or less
   $Fe_2O_3$: 0.0 wt % or more and less than 1.0 wt %.
10. A shaped product or an unshaped product obtained by using the inorganic fibers according to any one of 1 to 8.
11. A composite material obtained by using the inorganic fibers according to any one of 1 to 8.

According to the invention, it is possible to provide inorganic fibers having excellent bio-solubility and alumina reactivity resistance.

MODE FOR CARRYING OUT THE INVENTION

The inorganic fibers of the invention comprise the following composition wherein $SiO_2$, $Al_2O_3$, MgO and CaO are main components, and the inorganic fibers are produced by a melting method:
$SiO_2$: 3.0 wt % or more and less than 48.0 wt %
$Al_2O_3$: more than 20.0 wt % and 80.0 wt % or less
MgO: 1.0 wt % or more and 50.0 wt % or less
CaO: 1.0 wt % or more and 50.0 wt % or less
$Fe_2O_3$: 0.0 wt % or more and less than 1.0 wt %.

The main components mean that, among all the components contained in the inorganic fibers, the four components of which the contents (wt %) are the highest, are $SiO_2$, $Al_2O_3$, MgO and CaO.

It is preferred that the inorganic fibers of the invention have the following composition:
$SiO_2$: 4.0 wt % or more and 40.0 wt % or less
$Al_2O_3$: more than 20.0 wt % and 80.0 wt % or less
MgO: 3.0 wt % or more and 50.0 wt % or less
CaO: 6.0 wt % or more and 45.0 wt % or less
$Fe_2O_3$: 0.0 wt % or more and less than 1.0 wt %.

Further, the inorganic fibers of the invention may have the following composition:
$SiO_2$: 4.0 wt % or more and 35.0 wt % or less
$Al_2O_3$: more than 20.0 wt % and 75.0 wt % or less
MgO: 3.0 wt % or more and 45.0 wt % or less
CaO: 7.4 wt % or more and 40.0 wt % or less
$Fe_2O_3$: 0.0 wt % or more and less than 1.0 wt %.

Further, the inorganic fibers of the invention may have the following composition:
$SiO_2$: 15.0 wt % or more and 35.0 wt % or less
$Al_2O_3$: 40.0 wt % or more and 60.0 wt % or less
MgO: 5.0 wt % or more and 20.0 wt % or less
CaO: 8.0 wt % or more and 20.0 wt % or less
$Fe_2O_3$: 0.0 wt % or more and less than 1.0 wt %.

Further, the amount of $Fe_2O_3$ may be 0.5 wt % or less or 0.3 wt % or less.

The above amount of each component may be arbitrarily combined.

In respect of bio-solubility, it is preferred that the total of the amounts of MgO and CaO be more than 18.0 wt %.

The total of $SiO_2$, $Al_2O_3$, MgO and CaO may be 70.0 wt % or more, 75.0 wt % or more, 80.0 wt % or more, 85.0 wt % or more, 90.0 wt % or more, 95.0 wt % or more, 98.0 wt % or more, 99.0 wt % or more or 100.0 wt % (inevitable impurities may be contained).

The remaining other than the above oxides is oxides of the other elements, impurities or the like.

The inorganic fibers of the invention may or may not contain an oxide of a metal selected from Sc, La, Ce, Pr, Nd, Pm, Sm, Eu, Gd, Tb, Dy, Ho, Er, Tm, Yb, Lu, Y or a mixture thereof. The amount of these oxides may each be 5.0 wt % or less, 3.0 wt % or less, 2.0 wt % or less, 1.0 wt % or less or 0.5 wt % or less.

Each of the alkali metal oxides ($Na_2O$, $Li_2O$, $K_2O$ or the like) may or may not be contained. The amount thereof can be, independently or in total, 5.0 wt % or less, 3.0 wt % or less, 2.0 wt % or less, 1.0 wt % or less or 0.5 wt % or less.

Each of $TiO_2$, ZnO, $B_2O_3$, $P_2O_5$, SrO, BaO, $Cr_2O_3$ and $ZrO_2$ may or may not be contained. The amount thereof can each be 5.0 wt % or less, 3.0 wt % or less, 2.0 wt % or less, 1.0 wt % or less or 0.5 wt % or less.

Due to the above-mentioned composition, the inorganic fibers of the invention have excellent alumina reactivity resistance and bio-solubility.

The inorganic fibers are produced by a melting method. In the melting method, fibers are prepared by preparing a melt of raw materials in the customary manner, and allowing the melt to be fibrous. For example, fibers can be prepared by a spinning method in which a molten raw material is flown onto a wheel which is rotating at a high speed, or by a blowing method in which compressed air is applied to a molten raw material.

According to a melting method, the resulting inorganic fibers have a higher bio-solubility as compared with those obtained by a sol-gel method.

The average fiber diameter of the inorganic fibers of the invention is normally 0.1 to 50 μm, preferably, 0.5 to 20 μm, further preferably 1 to 10 μm, and most preferably 1 to 8 μm. The average fiber diameter may be adjusted to be an intended value by a known method such as the number of rotation, acceleration, compressed air pressure, air flow velocity, air flow amount or the like.

The inorganic fibers of the invention may or may not be subjected to a heat treatment.

If a heat treatment is conducted, the temperature may be a temperature at which the fiber shape be retained. Since the physical properties of the fibers vary by the heating temperature and the heating time, the fibers may be treated appropriately such that desired performance (creep resistance, shrinkage, strength, elasticity) can be exhibited.

The inorganic fibers change from amorphous to crystalline by a certain heat treatment. As mentioned above, it suffices that desired performance is exhibited. The inorganic fibers may be either amorphous or crystalline, or may be a state in which an amorphous part and a crystalline part are mixed.

The heating temperature is, for example, 600° C. or higher, 700° C. or higher, 800° C. or higher, 900° C. or higher and 1000° C. or higher.

By having the above-mentioned composition, the inorganic fibers of the invention are dissolved in physiological saline having a pH of 4.5. Further, they have solubility after heating (after crystallizing).

The dissolution velocity constant that is measured by the same method as used in Examples is preferably 50 ppm/($m^2$/g) or more, 100 ppm/($m^2$/g) or more and 200 ppm/($m^2$/g) or more.

The inorganic fibers of the invention have low alumina reactivity. Preferably the inorganic fibers do not react with alumina at least at 1400° C. Not reacting with alumina means that, by the method in Examples, an alumina pellet does not adhere to a fleece or a blanket made from the fiber.

The inorganic fibers of the invention preferably have a tensile strength of 60 kPa or more, 70 kPa or more, 80 kPa or more or 85 kPa or more as measured by the method in Examples.

Various secondary products can be obtained from the fibers of the invention. For example, a shaped product such as bulk, blanket, block, rope, yarn, text fabrics, fiber applied with a surfactant, shot-less bulk in which shots (un-fibrous product) have been reduced or removed, a board produced by using a solvent such as water, a mold, paper, felt, wet felt impregnated with colloidal silica, or the like can be obtained. Further, a shaped product obtained by impregnating these shaped products with colloid or the like can be obtained. Further, an unshaped product (mastic, caster, coating or the like) produced by using a solvent such as water can be obtained. In addition, a structural body obtained by combining the shaped product or the unshaped product, and various heaters can be obtained.

As specific applications of the fibers of the invention, a heat treating apparatus, a joint in a furnace such as an industrial furnace and an incinerator, a joint which fills the gap of a refractory tile, an insulating brick, a shell, and a refractory mortar, a sealing material, a packing material, a cushion material, an insulating material, a refractory material, a fire proofing material, a heat-retention material, a protective material, a coating material, a filtering material, a filter material, an insulating material, a joint, a filler, a repairing material, a heat resistant material, a non-combustible material, a sound proof material, a sound absorbing material, a friction material (an additive for brake pad, for example), a glass plate/steel plate conveying roll, an automobile catalyst carrier retaining material, various fiber-reinforced composite materials (reinforcing fibers for fiber-reinforced cement, fiber-reinforced plastics, reinforcing fibers for a heat resistant material or a refractory material, and reinforcing fibers for an adhesive, a coating material, for example) can be given.

EXAMPLES

Examples 1 to 16 and Comparative Examples 1 to 5

The fibers having the composition shown in Table 1 were prepared by a melting method, and evaluated by the following methods. The results are shown in Table 1.

The fibers in Comparative Examples 1 to 3 are inorganic fibers produced by a sol-gel method, and Comparative Examples 1 to 3 are data described in Patent Document 3 (JP-T-2009-515800).

The values of the dissolution velocity constant in Comparative Examples 1 to 3 are the total of the dissolution velocity constant values of $Al_2O_3$, $SiO_2$, CaO and MgO.
(Bio-solubility)

The bio-solubility of the unheated fibers in Examples 1 to 16 and Comparative Examples 4 and 5 was measured by the following method.

The fibers were placed on a membrane filter. On the fibers, physiological saline having a pH of 4.5 was added dropwise from a micro pump. The filtrate which had passed through the fibers was collected in a container. The collected filtrate was taken out after the passage of 24 hours. The eluent components were quantified by an ICP emission analyzer to calculate the solubility. The elements to be measured were four elements, i.e. Si, Al, Mg and Ca, that were main elements. The average fiber diameter was measured and converted to the dissolution rate constant (unit: $ppm/(m^2/g)$), which was the eluent amount per unit surface area.
(Alumina Reactivity)

The alumina reactivity of the fiber in Examples 1 to 16 and Comparative Examples 4 and 5 was measured by the following method.

About 1 g of alumina powder having purity of 99% or more was press-molded by means of a mold having a diameter of 17 mm to obtain a pellet. The pellet was placed on a fleece or blanket-like sample (50 mm×50 mm, thickness: 5 to 50 mm) that was made from the fiber. The sample was heated at 1400° C. for 8 hours to confirm the reactivity after the heating. The sample which did not react with the pellet at all were evaluated as good (○). The sample which reacted with the pellet (the pellet and the sample were molten and adhered to each other) were evaluated as poor (×).
(Average Fiber Diameter)

The average fiber diameter was measured by the following method.

400 or more fibers were observed and photographed by an electron microscope. Thereafter, the diameter was measured for the photographed fibers, and the average value of all of the measured fibers was taken as the average fiber diameter.
(Tensile Strength)

The tensile strength was measured by the following method.

A blanket having a density of about 130 kg/m³ prepared by passing a needle through fiber was cut to have a length of 150 mm, a width of 50 mm and a thickness of 25 mm. A tensile test was conducted by means of a universal tester. As for the testing conditions, the distance between fixtures was 100 mm and the tensile speed of a test sample was 20 mm/min. Five points were measured for each fiber, and the average value of the maximum load under which the test sample was broken was taken as a tensile strength.

TABLE 1

| | Composition (wt %) | | | | | | | | Average fiber diameter (μm) | Dissolution velocity constant (ppm/(m²/g)) PH 4.5 | Alumina reactivity resistance 1400° C. × 8 hr | Tensile strength (kPa) |
|---|---|---|---|---|---|---|---|---|---|---|---|---|
| | $SiO_2$ | $Al_2O_3$ | MgO | CaO | $Na_2O$ | $Fe_2O_3$ | $P_2O_5$ | $ZrO_2$ | | | | |
| Example 1 | 23.5 | 55.4 | 10.7 | 10.2 | | 0.2 | | | 3.4 | 757.8 | ○ | |
| Example 2 | 22.0 | 54.6 | 10.7 | 12.4 | | 0.2 | | | 3.8 | 1108.3 | ○ | |
| Example 3 | 21.5 | 48.5 | 10.4 | 19.4 | | 0.3 | | | 3.5 | 1187.2 | ○ | |
| Example 4 | 27.4 | 50.8 | 16.3 | 4.9 | 0.3 | 0.2 | 0.1 | | | | ○ | |
| Example 5 | 23.0 | 52.5 | 11.1 | 12.8 | 0.2 | 0.1 | | | 2.5 | 691.7 | ○ | |
| Example 6 | 32.5 | 44.0 | 8.4 | 14.5 | 0.2 | 0.1 | 0.1 | | 2.9 | 932.8 | ○ | |
| Example 7 | 18.5 | 59.3 | 8.7 | 13.0 | 0.3 | 0.1 | 0.1 | | | | ○ | |
| Example 8 | 20.4 | 55.1 | 10.1 | 13.9 | 0.3 | 0.1 | 0.1 | | 2.2 | 692.2 | ○ | |
| Example 9 | 31.7 | 47.0 | 8.5 | 12.5 | 0.2 | 0.1 | 0.1 | | 2.3 | 670.6 | ○ | |
| Example 10 | 30.5 | 45.8 | 10.6 | 12.6 | 0.2 | 0.1 | 0.1 | | 2.1 | 529.4 | ○ | |
| Example 11 | 30.3 | 47.1 | 11.3 | 11.0 | 0.2 | 0.1 | 0.1 | | 1.9 | 573.3 | ○ | 104 |
| Example 12 | 28.2 | 51.8 | 9.0 | 10.8 | 0.0 | 0.1 | 0.1 | | | | ○ | 89 |
| Example 13 | 25.8 | 52.1 | 10.4 | 11.1 | 0.4 | 0.1 | 0.1 | | 1.8 | 497.8 | ○ | |
| Example 14 | 26.4 | 52.6 | 9.5 | 10.9 | 0.3 | 0.1 | 0.1 | | 1.6 | 402.8 | ○ | |
| Example 15 | 25.3 | 51.7 | 11.1 | 11.7 | 0.0 | 0.1 | 0.1 | | 2.1 | 614.4 | ○ | 90 |
| Example 16 | 24.4 | 53.2 | 7.8 | 14.2 | 0.3 | 0.1 | 0.1 | | | | ○ | |
| Comp. Ex. 1 | 24.2 | 62.0 | 7.2 | 7.4 | | | | | | 3.5 | — | |
| Comp. Ex. 2 | 23.0 | 57.4 | 9.6 | 10.1 | | | | | | 13.0 | — | |

TABLE 1-continued

| | Composition (wt %) | | | | | | | | Average fiber diameter (μm) | Dissolution velocity constant (ppm/(m²/g)) PH 4.5 | Alumina reactivity resistance 1400° C. × 8 hr | Tensile strength (kPa) |
|---|---|---|---|---|---|---|---|---|---|---|---|---|
| | SiO₂ | Al₂O₃ | MgO | CaO | Na₂O | Fe₂O₃ | P₂O₅ | ZrO₂ | | | | |
| Comp. Ex. 3 | 21.8 | 54.4 | 12.1 | 12.7 | | | | | | 23.2 | — | |
| Comp. Ex. 4 | 71.8 | 2.1 | 0.3 | 25.6 | 0.3 | 0.1 | | | | 29.4 | X | 44 |
| Comp. Ex. 5 | 46.9 | 52.3 | | | | | | | 2.8 | 11.7 | ○ | 45 |

Examples 17 to 29

As for the fiber composition shown in Table 2, the following examination was made.

The raw materials were mixed such that the composition shown in Table 2 was realized. Then, the mixed raw materials were pressed to obtain a compact. This compact was molten by heating, and then quenched. The resultant was pulverized to obtain a sample. By using this sample, an evaluation was conducted by the following method. The results are shown in Table 2.

As reference, the data of the fiber having a composition shown in Comparative Examples 5 and 6 is given.

(Bio-solubility)

1 g of the sample was put in an Erlenmeyer flask (volume: 300 mL) accommodating 150 ml of physiological saline having a pH of 4.5. This flask was set in an incubator of 37° C., and horizontal vibration of 120 rpm was continuously applied for 2.5 hours. Thereafter, the amount (mg) of each element contained in a filtrate obtained by filtration was measured by an ICP emission spectrometer and the total thereof was taken as an eluted amount (mg/1 g of sample).

For the purpose of comparison, the fibers in Comparative Examples 5 and 6 were similarly evaluated.

(Alumina Reactivity Resistance)

The sample was formed to obtain a cylindrical sample having a diameter of about 7 mm and a thickness of about 5 mm. This cylindrical sample was put on an aluminum plate, heated at 1400° C. for 8 hours, and observed whether adhesion or melting occurred. When the cylindrical sample was molten, it was evaluated as 4, when the sample was adhered, it was evaluated as 3, when the sample was not adhered but left scratches, it was evaluated as 2, and when the sample was not adhered and left no scratches, it was evaluated as 1.

TABLE 2

| | Composition (wt %) | | | | | | | | Eluted amount (mg/g of sample) pH4.5 | Alumina reactivity resistance 1400° C.-8h |
|---|---|---|---|---|---|---|---|---|---|---|
| | SiO₂ | Al₂O₃ | MgO | CaO | Na₂O | K₂O | ZrO₂ | Fe₂O₃ | | |
| Example 17 | 31.2 | 47.5 | 8.8 | 12.3 | | | 0.1 | 0.0 | 5.2 | 1 |
| Example 18 | 25.8 | 25.7 | 37.6 | 11.0 | | | 0.0 | | 25.5 | 2 |
| Example 19 | 24.8 | 53.4 | 6.9 | 14.7 | | | 0.1 | 0.0 | 5.3 | 1 |
| Example 20 | 23.4 | 55.8 | 8.6 | 12.0 | | | 0.1 | | 4.5 | 1 |
| Example 21 | 21.4 | 30.1 | 37.1 | 11.2 | | | 0.1 | | 32.7 | 2 |
| Example 22 | 19.4 | 28.4 | 25.1 | 26.9 | | | 0.1 | 0.04 | 9.7 | 2 |
| Example 23 | 19.0 | 30.7 | 35.3 | 14.9 | | | 0.1 | | 11.5 | 1 |
| Example 24 | 18.9 | 32.0 | 41.3 | 7.7 | | | 0.1 | 0.04 | 14.6 | 1 |
| Example 25 | 18.7 | 61.6 | 9.2 | 10.3 | | | 0.2 | | 5.5 | 1 |
| Example 26 | 18.6 | 29.7 | 30.0 | 21.6 | | | 0.1 | | 10.8 | 1 |
| Example 27 | 16.7 | 43.5 | 28.6 | 11.1 | | | 0.1 | | 27.0 | 2 |
| Example 28 | 16.0 | 47.2 | 8.6 | 28.0 | | | 0.1 | | 3.7 | 1 |
| Example 29 | 4.7 | 66.0 | 9.3 | 19.9 | | | 0.1 | 0.0 | 5.9 | 1 |
| Comp. Ex. 5 | 46.9 | 52.3 | | | | | | | 0.8 | 1 |
| Comp. Ex. 6 | 46.3 | 30.4 | | | | | 23.1 | | 0.8 | 1 |

INDUSTRIAL APPLICABILITY

The inorganic fibers of the invention can be used for various applications as a heat resistant material or a substitute for asbestos.

Although only some exemplary embodiments and/or examples of this invention have been described in detail above, those skilled in the art will readily appreciate that many modifications are possible in the exemplary embodiments and/or examples without materially departing from the novel teachings and advantages of this invention. Accordingly, all such modifications are intended to be included within the scope of this invention.

The documents described in the specification and the specification of Japanese application(s) on the basis of which the present application claims Paris convention priority are incorporated herein by reference in its entirety.

The invention claimed is:

1. Inorganic fibers comprising the following composition, SiO₂, Al₂O₃, MgO and CaO being main components, and the inorganic fibers being produced by a melting method:
   SiO₂: 15.0 wt % or more and 35.0 wt % or less
   Al₂O₃: 40.0 wt % or more and 60.0 wt % or less
   MgO: 5.0 wt % or more and 20.0 wt % or less CaO: 8.0 wt % or more and 20.0 wt % or less
$Fe_2O_3$: 0.0 wt % or more and less than 1.0 wt %
total of the amounts of MgO and CaO: more than 18.0 wt %.

2. The inorganic fibers according to claim 1, wherein the total of the amounts of $SiO_2$, $Al_2O_3$, MgO and CaO is more than 75.0 wt %.

3. The inorganic fibers according to claim 1, wherein the total of the amounts of $SiO_2$, $Al_2O_3$, MgO and CaO is more than 80.0 wt %.

4. The inorganic fibers according to claim 1, wherein the total of the amounts of $SiO_2$, $Al_2O_3$, MgO and CaO is more than 90.0 wt %.

5. The inorganic fibers according to claim 1, which comprise one or more selected from $ZrO_2$, $TiO_2$, $Na_2O$, $K_2O$, $P_2O_5$ and $B_2O_3$.

6. A shaped product or an unshaped product obtained by using the inorganic fibers according to claim 1.

7. A composite material obtained by using the inorganic fibers according to claim 1.

8. A method for producing inorganic fibers, comprising: causing a melt to be inorganic fibers, the melt comprising the following composition wherein $SiO_2$, $Al_2O_3$, MgO and CaO are main components:
$SiO_2$: 15.0 wt % or more and 35.0 wt % or less
$Al_2O_3$: 40.0 wt % or more and 60.0 wt % or less
MgO: 5.0 wt % or more and 20.0 wt % or less
CaO: 8.0 wt % or more and 20.0 wt % or less
$Fe_2O_3$: 0.0 wt % or more and less than 1.0 wt %
total of the amounts of MgO and CaO: more than 18.0 wt %.

\* \* \* \* \*